Jan. 2, 1962            A. HECKER            3,015,435
CASH DRAWER MECHANISM FOR CASH REGISTERS
AND OTHER BUSINESS MACHINES
Filed April 8, 1957                                  4 Sheets-Sheet 1

Inventor:

Alfred Hecker

Jan. 2, 1962 A. HECKER 3,015,435
CASH DRAWER MECHANISM FOR CASH REGISTERS
AND OTHER BUSINESS MACHINES
Filed April 8, 1957 4 Sheets-Sheet 2
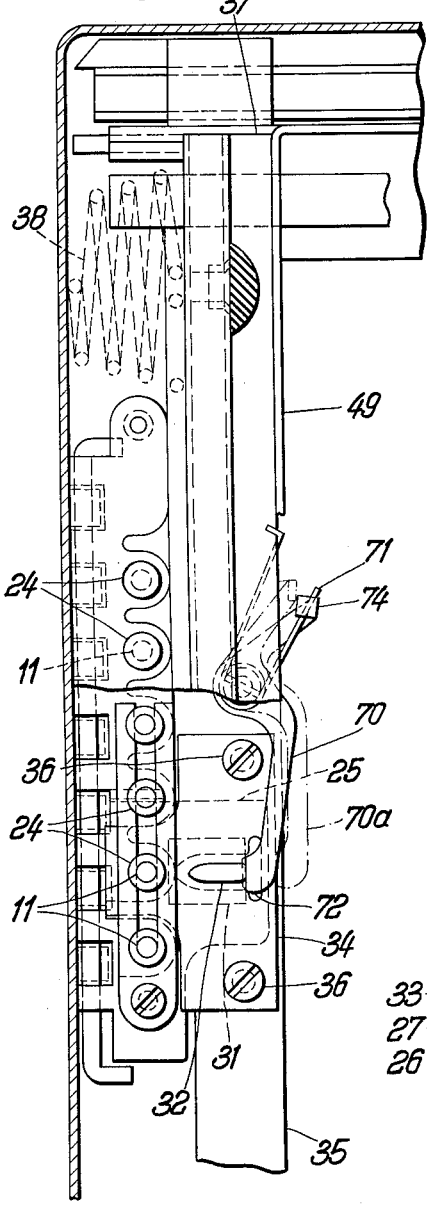
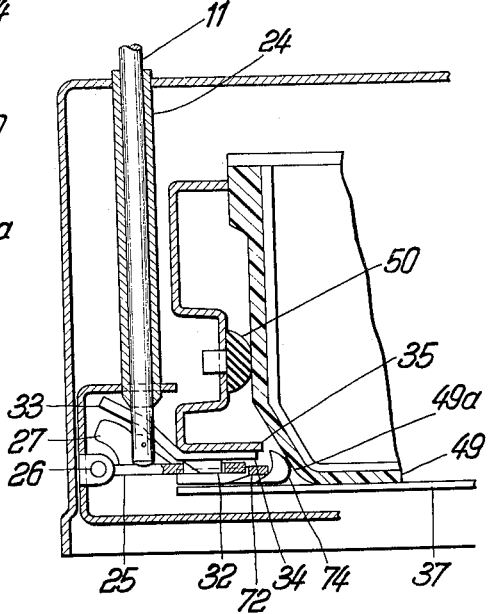

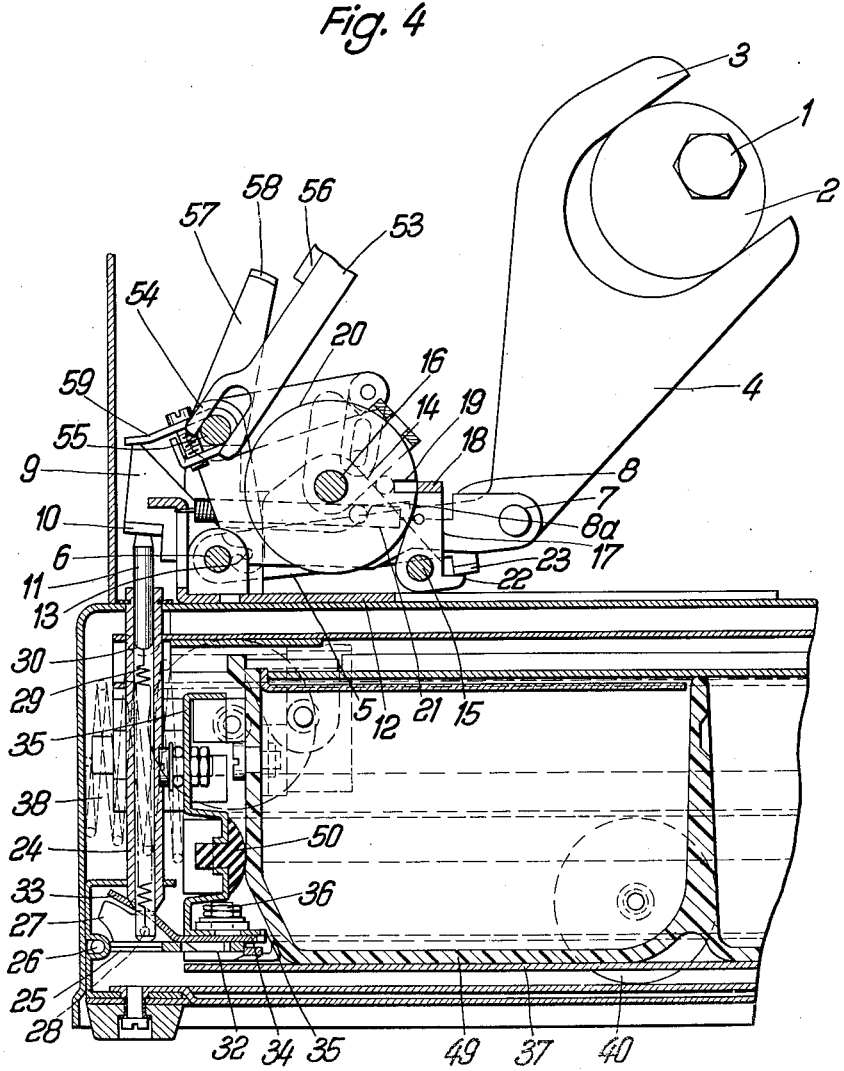

Jan. 2, 1962 A. HECKER 3,015,435
CASH DRAWER MECHANISM FOR CASH REGISTERS
AND OTHER BUSINESS MACHINES
Filed April 8, 1957 4 Sheets-Sheet 4

Inventor:

Alfred Hecker

3,015,435
CASH DRAWER MECHANISM FOR CASH REGISTERS AND OTHER BUSINESS MACHINES
Alfred Hecker, Bielefeld, Germany, assignor to Anker-Werke Aktiengesellschaft, Bielefeld, Germany, a corporation of Germany
Filed Apr. 8, 1957, Ser. No. 651,288
Claims priority, application Germany May 18, 1956
11 Claims. (Cl. 235—22)

My invention relates to a cash drawer mechanism for cash registers or similar business machines. It pertains in particular to means to prevent the closing and latching of the cash drawer when the money insert has been removed from the cash drawer.

As a rule, a store owner or other authorized person, after the close of a business day, removes from the drawer of the cash register the money-tray insert and the daily receipts contained therein, and takes the insert into his office or residence for accounting and safe-keeping. The cash drawer is then usually closed and the cash register locked by means of a key. Consequently, it cannot be determined from the outstide, that is, without operating the cash register, that the money tray has been removed. Experience has shown that when a store is broken into, the burglar in most cases, when searching for money in the cash register, breaks the cash register open by force because the cash register cannot be operated without the key which has been removed by the owner. In such cases, the damage done to the machine is often so considerable that entire sub-assemblies must be exchanged for repair. This is very expensive, particularly with machinery of high grade.

According to a more specific object of my invention, I provide the cash register, or other business machine, with means which prevents closing or locking of the cash drawer when the money-receiving tray or insert is removed.

As a result, the above-mentioned damage and resulting expenditure should no longer occur.

According to my invention, the latch member, which keeps the cash drawer arrested within the cash register when the drawer is pushed into the machine, is made inactive by means of another latching member when the money tray has been removed from the drawer, so that thereafter a movement of the drawer-latching member into the latching position is prevented. As a result, when the insert is removed from the drawer, the closing and latching of the drawer is impossible so that the absence of the money-containing insert is immediately and conspicuously apparent, and an inadvertent closing and locking of the drawer by the owner or other authorized person is positively prevented.

The above-mentioned and more specific objects and features of my invention will be apparent from the preferred embodiment hereafter described and illustrated in the accompanying drawing, in which—

FIG. 2 is a partly sectional fragmentary view, from below, of the drawer frame which contains teh money-tray insert.

FIG. 3 is a partial and sectional view of the left end of the drawer, as viewed in FIG. 1, FIG. 4 illustrates part of the mechanism employed to release the money drawer under the action of the main control shaft.

Figure 1:
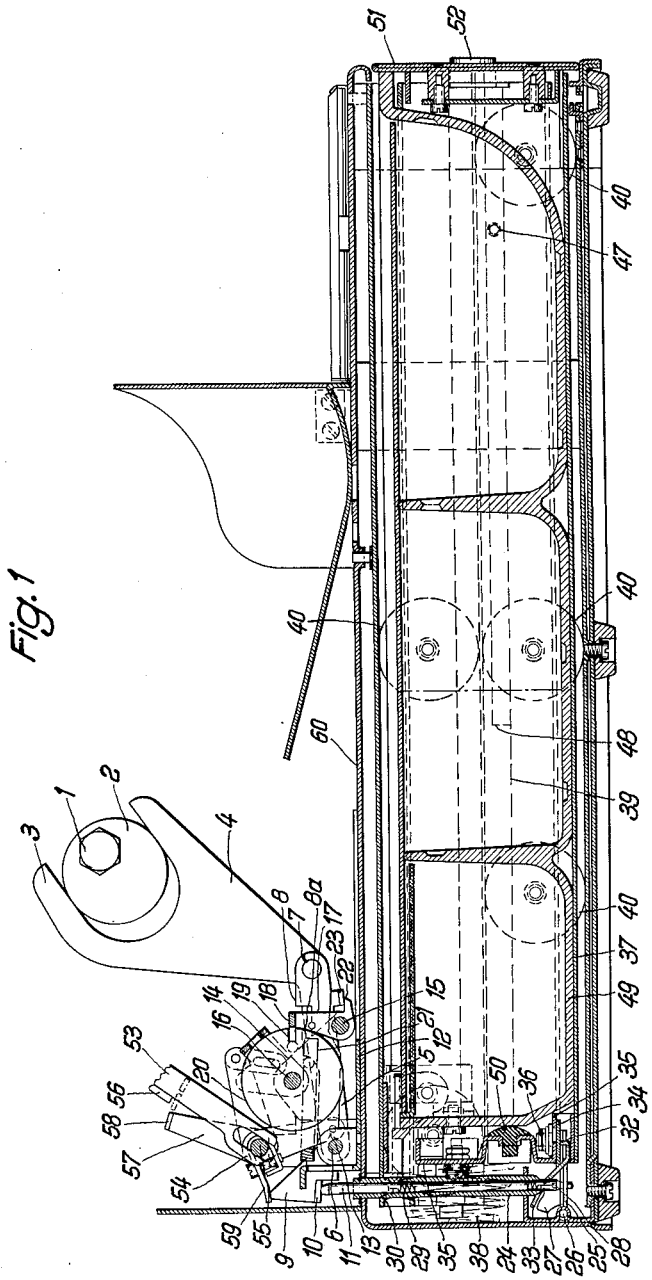
FIG. 1 is a longitudinal sectional view of the drawer portion of a cash register, viewed from the left-hand side of the machine.

An eccentric 2, mounted on main control shaft 1 (FIG. 1), is straddled by a bifurcated portion 3 of a rocker arm 4. Shaft 1 may be actuated when the motor bar of the register is depressed. For example, it may make one revolution each time the motor bar (not shown) is depressed. Arm 4 has a rigid extension 5 which is pivotally mounted on a shaft 6. A pin 7, riveted into the arm 4, serves as pivot for a pawl 8. Pawl 8 has a nose 9 carrying a lateral lug 10 which cooperates with or actuates a vertical pin 11. A bearing structure or plate 12 is provided with upwardly bent lugs 13 which journal the shaft 6, and with upwardly bent portions providing plates 14 which journal shafts 15 and 16. Mounted on shaft 15 is a pawl provided with a lateral lug 18 which cooperates with a notch 19 of a disc 20. Disc 20 is fastened onto the shaft 16. The operation of disc 20 is explained below. A spring 21 urges the pawl 18 counterclockwise, so that an extension 22 of pawl 18 can cooperate with a lateral lug 23 of the arm 4.

Each individual cash drawer with which the cash register is provided is equipped with a pin 11 as mentioned above. It is understood, of course, that this invention may be embodied in cash registers having multiple drawers as well as those having single drawers, and in the same manner for each individual cash drawer. Each pin 11 is slidably guided within a sleeve 24 (FIGS. 1, 2, 3). The lower end of each pin 11 presses downwardly against a pawl 25 pivotally mounted on a horizontal pivot pin 26. The pawl 25 carries an extension 27 which forms an eye 28 (FIGS. 1, 3). A spring 29, hung in a depression 30 of the machine frame 60 and having its other end attached to the eye 28, biases the pawl 25 counterclockwise and thus tends to lift the pin 11 relative to the position of FIG. 1. The extension 27 serves to limit the movement of the pawl 25. The pawl 25 is provided with an opening 31 (FIG. 2) down through or into which the hook 32 of a latch piece 34 can pass or fit. The latch piece 34 has an extension 33 and is connected or fastened by screws 36 to the rear frame portion 35 of the cash drawer. The rear portion 35 of the cash drawer is connected with the drawer frame 37 proper. Connected with portion 35 are springs 38 which, in the known manner, push the drawer 35—37, when unlatched, out of the machine housing 60.

Connected with the drawer frame 37 are angular side rails 39 (FIG. 1) which carry rotatable rollers 40. The rollers 40 permit easy or free movement of the drawer frame 37. The drawer frame 37 serves for the reception of the money-tray insert 49. To limit the movement of the drawer frame, a stop pin 47 (FIG. 1) is provided which cooperates with a projection 48 of the drawer frame 37. The money-tray insert 49 is held in the rear portion of the drawer frame 37 against rubber buffers 50, whereas the front portion of the tray 49 rests against the front portion 51 of the drawer frame 37. The money-tray insert 49 is resiliently clamped in the drawer 37 between the front wall 51 and the rubber buffers 50, so that it can easily be taken out. The rubber buffers 50 serve to prevent relative motion of the money container 49 and to transmit any impact resiliently upon the insert 49 during the abrupt opening motion of the drawer 37. A conventional key lock 52 is provided to lock the drawer in its closed position.

When the drawer 37 is open, the operation of the machine, that is, the initiating of the machine operation, is prevented. For this purpose there is provided, in known fashion, a forked rod 53 (FIG. 1) which is connected with the operation-releasing or initiating shaft 77 (FIG. 5) of the machine. The fork 54 of the rod 53 is guided on a shaft 55. A lateral lug 56 of the forked rod 53 is designed to cooperate with a lateral lug 58 of an arm 57.

The arm 57 is firmly connected with the shaft 55. Clamped upon the shaft 55 is an angle piece 59 which can cooperate wtih the nose 9 of pawl 8.

Release, that is, initiation, of the machine operation when the drawer is open is prevented by the fact that, when the drawer is pushed to open position by the force of spring 38, the releasing pin 11 is pulled by its spring 29 and jumps upwardly (FIG. 1), whereby it causes the nose 9 of pawl 8 to turn the clamping piece 59, and thus the arm 57, in the clockwise direction. As a result, the arm 57 positions its lateral lug 58 beneath the lug 56 of the forked rod 53, and thus prevents a movement of the forked rod 53 which is connected to the operation-initiating device of the machine, as is more fully explained below with reference to FIG 5.

Pivotally mounted on the rear portion 35 of the drawer frame 37 (FIG. 2) is a latch lever 70 which is biased clockwise by a spring 71. When the money-tray insert 49 is inserted into the drawer frame, the incline 49a (FIG. 3) of the tray insert presses against lateral lug 74, urging latch lever 70 into the position illustrated at dotted outline 70a in FIG. 2. When, at the close of a business day, the insert 49 is removed from the drawer frame 37, the latch lever 70 under the action of its spring 71 turns into the position of rest shown in FIG. 2 by full lines. In this position, the projection 72 of latch lever 70 abuts against the hook 32 of the latch piece 34.

The operation of the above-described device is as follows.

In order to release the cash drawer, it is necessary to have the notch 19 of disc 20 placed opposite the lug 18 of the arm pawl 17. The disc 20, for this purpose, is correspondingly controlled by the known control devices of the cash register as described below. Upon initiating the machine operation, the eccentric 2 causes the arm 4 to turn about its pivot shaft 6 in the counterclockwise direction. As a result, the extension 22 of pawl 17 is released so that the lug 18 of the pawl, under the action of its spring 21, can introduce itself into the notch 19. In the further course of rotation of arm 4 in the counterclockwise direction, the nose 8a of pawl 8 places itself beneath the lateral lug 18 of pawl 17. This causes the pawl 8 to pivot on pin 7 so that its nose 9 is pressed downwardly. Lug 10 of nose 9 moves the releasing pin 11, and thus the pawl 25, downwardly. In this manner, the hook 32 is released. Now, under the force of springs 38, the drawer is flung forwardly and, if desired, can be pulled into the extreme open position limited by the stop pins 47.

If now the money-tray insert 49 is taken out of the drawer frame 37, then, as already described, the latch lever 70 is urged by its spring 71 into the position illustrated in full lines in FIG. 2. If thereafter the drawer frame 37 is moved into the fully closed position illustrated in FIG. 1, it is impossible for the pawl 25 to move upwardly sufficiently to have its opening 31 catch behind the hook 32 for arresting the drawer frame 37 in the machine. Consequently, the springs 38 now press the drawer frame 37 again back into its open position. At the same time, the above-described linking mechanism comprising the parts 11, 10, 9, 59, 55 turn the arm 57 (FIG. 1), under the force of the spring 29, into its effective position, in which the arm 57 positions its lug 58 beneath the lug 56 of the forked rod 53. Consequently, initiation of the machine operation is also prevented, as long as the money tray 49 is removed from the cash drawer.

However, when the insert 49 is again inserted into the drawer frame 37, the latch lever 70 is again moved, by pressure of the inclined surface 49a against lug 74, into the ineffective position 70a shown by broken lines in FIG. 2. When now the drawer frame 37 is pushed into the cash register, the pawl 25 is now capable of catching behind the hook 32 of the latching piece 34 so that the drawer frame 37 is kept arrested and latched in the position shown in FIG. 1.

As will be seen from FIG. 4, the setting of the disc 20 is effected by means of a transmitting mechanism under control by a key of the operation-controlling key bank (not shown). For this purpose, the disc 20 is connected with an angular lever 152 by means of a pull rod 150. Lever 152 is pivoted on the shaft 151. A link 153 connects the lever 152 with a spur gear 156 rotatable on a shaft 155. The spur gear 156 is driven by a switching mechanism, the operation of which is, in the conventional manner, correlated to the control key bank. For instance, if the totalizing key in the control key bank is actuated, the correlated switching mechanism is operated from the main control shaft 1 of the machine to advance to a stop formed by the depressed totalizer key. This advancing motion is imparted to the spur gear 156 and is transmitted by link 153, lever 152 and pull rod 150 to the disc 20. As a result, the disc 20 is turned about its pivot shaft 16 counterclockwise until the notch 19 is opposite the lug 18 of pawl 17. Only then can the money drawer 37 be released under the action of the main control shaft 1, in the manner already described. The setting of switching mechanisms in accordance with depressed keys under control by the main control shaft of the machine is illustrated and described in American Patent No. 2,279,858.

Figure 5:
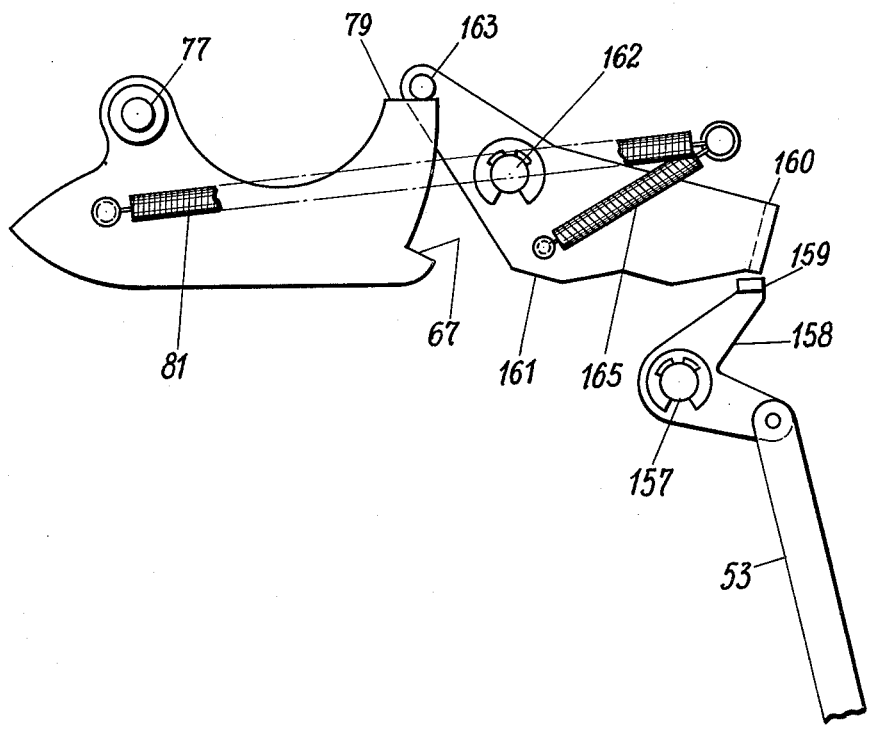
FIG. 5 illustrates linkage between the operation-initiating device of the machine and elements controlled by the open or closed condition of the drawer.

The linkage of rod 53 to the operation-initiation mechanism is illustrated in FIG. 5. The forked rod 53 is linked to an angular lever 158 pivoted on a shaft 157. The lever 158 has a lateral lug 159 which cooperates with a lateral lug 160 of a switching lever 161. The switching lever 161 is pivotally mounted on a pivot pin 162 and carries a pin 163. A spring 165 connected with the switching lever 161 biases this lever continuously in counterclockwise direction so that the pin 163 of lever 161 always abuts against a switching member 79 fastened on the releasing shaft 77. A spring 81 connected with the switching member 79 tends to move this member and thus also the releasing shaft 77 in counterclockwise direction. Such movement, however, is prevented in the inactive condition of the machine by means of a blocking device (not illustrated). The projection 67 of switching member 79 abuts against a control shaft (likewise not illustrated) of the blocking device when the machine is inactive. When, to initiate machine operation, the releasing keys of the machine are actuated in the correct combination, the blocking action ceases and the spring 81 can turn the switching member 79, and thus also the releasing shaft 77, counterclockwise. This pushes pin 163 and turns switching lever 161 clockwise. During such movement of switching lever 161, lug 160 acting upon lug 159 turns angular lever 150 likewise in clockwise direction, thus moving the forked rod 53 downward.

If the releasing keys of the machine have been actuated while the drawer 52 is open, that is, when the switching member 79 is no longer blocked by the above-mentioned blocking device, then the spring 81 is still incapable of turning the switching member 79 counterclockwise because now the lug 56 (FIG. 1) of the forked rod 53 rests upon the lug 58 of the arm 57 so that the forked rod 53, acting through the angular lever 158, prevents a movement of the switching lever 161.

A blocking device of the above-mentioned type, of which only the switching member 79 and the releasing shaft 77 are illustrated in FIG. 5, is described in German Patent No. 951,538. The German patent also illustrates and describes the drive of the main control shaft of the machine.

By means of the present invention, the closing and latching of the cash drawer, after removing the tray insert 39, is impossible, so that the above-mentioned danger of burglar damage to the cash register, in an effort to obtain money no longer present, is eliminated.

It will be obvious to those skilled in the art, upon a study of this disclosure, that the specific embodiment described can be modified with respect to its mechanical details without departing from the essence of the invention.

I claim:
1. In a business machine provided with a cash drawer movable to a closed and open position and having a money-tray insert removably positioned in said drawer, a latch member for arresting the cash drawer within the machine when the drawer is pushed into the machine to said closed position, operation-blocking means for preventing initiation of operation of said machine and shiftable to a blocking and non-blocking position, lever means biased to move to a predetermined position upon removal of said insert from said drawer and to prevent while in said predetermined position said latch member from causing the cash drawer to become so arrested, said operation-blocking means cooperating with said latch member for actuation thereby into said blocking position when said lever means is in said predetermined position, whereby latching of the cash drawer is prevented when the money-tray insert is not in position in the drawer.

2. In a cash register machine provided with a cash drawer and a money-tray insert removably positioned in said drawer, a pivoted latch member engageable in one pivoted position thereof for arresting said cash drawer within the cash register when said drawer is pushed into said machine, means including a retractable pin engageable by said latch member in another pivoted position thereof to prevent initiation of the machine operation, guide means to pivot said latch member upon movement of said drawer, latch-preventing means to prevent engagement of said latch member with said drawer when said insert is not in position in the drawer and thus preventing said drawer from becoming so arrested, said pivoted latch member having means associated therewith for urging same to said one position under control by said guide means so as to actuate said pin for retraction of the latter to prevent initiation of said machine when said latch member is prevented from occupying said other position by said latch-preventing member, whereby locking of said cash drawer and machine operation is prevented when the money tray is not in position in said drawer.

3. In a business machine provided with a cash drawer movable to a closed and open position and having a removable money-tray insert positioned in said drawer, a latch mechanism including a pivoted latching element for arresting said cash drawer within the machine when said drawer is pushed into the machine to said closed position, second latch means carried by said drawer movable to an inactivating position for preventing said latching element from causing said cash drawer to become so arrested when the money-tray insert is removed from said drawer, said money-tray insert having a surface normally abutting said second latch means to hold the latter away from said deactivating position when said insert is in said cash drawer and to thereby permit the arresting operation of the pivoted latching element, whereby latching of said cash drawer is prevented when said money-tray is removed from said cash drawer.

4. In a cash register machine provided with a cash drawer movable to a closed and open position and having a money-tray insert removably positioned in said drawer, a latching mechanism including a latching element for arresting said cash drawer within the machine when said drawer is pushed into said machine to said closed position, said mechanism further including elements operatively connected to an operation-initiating member of said machine, which elements prevent operation of the machine when the cash drawer is released from its arrested position, and means to prevent said latch member from keeping the cash drawer so arrested, said means being actuated when said money-tray insert is removed, whereby locking of the cash drawer is prevented when said money tray insert is not in position in said drawer.

5. In a cash register machine provided with a cash drawer and a money-tray insert removably positioned in said drawer, a latching nose mounted on said drawer, a latch member engageable with said nose for keeping said cash drawer arrested within said cash register when said drawer is pushed into said machine, means to prevent initiation of said machine operation when said insert is absent from the drawer and to prevent said latch member from causing said cash drawer to become so arrested, said means including an element normally abutting the money-tray insert and having a portion of said element movable to a position adjacent said nose to prevent engagement of said latch member with said nose when the money-tray insert is removed, whereby locking of the cash drawer and machine operation is prevented when said money tray insert is not in position in the drawer.

6. In a motor-driven cash register machine provided with a cash drawer and a money-tray insert removably positioned in said drawer, a latching mechanism including a latching element for arresting said cash drawer within said cash register when said drawer is pushed into said machine, means urging the drawer outwardly of said cash register, said latching mechanism including devices operatively connected to an operation-initiating member of the machine, which devices prevent operation of the machine when said cash drawer is released from its arrested position, normally ineffective means pivotally carried by the said cash drawer and spring-positioned to block and prevent the latching element from keeping the cash drawer so arrested within the cash register, and means associated with the money-tray insert to prevent initiation of the machine operation when the money-tray insert is not in place in said cash drawer.

7. In a cash register machine provided with a cash drawer a money-tray insert removably positioned in said drawer, a latching nose mounted on said drawer, a pivoted latch member engageable with said nose for arresting said cash drawer within the cash register when said drawer is pushed into the machine, means actuatable to prevent initiation of the machine operation and to pivot said latch member to prevent the latter from causing the cash drawer to become so arrested, said means including a spring-biased lever normally abutting said money-tray insert when said insert is in position in said drawer and being urged adjacent said nose when said insert is removed to prevent engagement of said latch member with said nose, said means further including a spring-retractable pin operable in one position thereof to block initiation of the machine operation, said latch member having biasing means urging said latch member into engagement with said pin to move the pin into said one position when said latch member is not engaged with said nose, whereby locking of said cash drawer and machine operation is prevented when said money tray is not in position in said drawer.

8. In a cash register machine provided with a cash drawer and a money-tray insert removably positioned in said drawer, a latching nose mounted on said drawer, a latch member engageable with said nose for arresting said cash drawer within said cash register when said drawer is pushed into the machine, means actuatable to prevent initiation of the machine operation and to prevent said latch member from causing the cash drawer to become so arrested, said means including a spring-biased lever normally abutting said money-tray insert when said insert is in position in said drawer and being urged adjacent said nose when said insert is removed to prevent engagement of said latch member with said nose, said means further including a spring-retractable pin operable in one position thereof to block initiation of the machine operation, said latch member having biasing means urging said latch member into engagement with said pin to move said pin into said one position when said latch member is not engaged with said nose, whereby locking of said cash drawer and machine operation is prevented when said money tray is not in position in said drawer.

9. In a motor-driven cash register machine provided with a cash drawer movable to a closed and open position and having a money-tray insert removably positioned in said drawer, a latching mechanism including a latching element for arresting said cash drawer within said cash register when said drawer is pushed into said machine, means urging said drawer outwardly of said cash register, said latching mechanism including devices operatively connected to an operation-initiating member of said machine, which devices prevent operation of said machine when said cash drawer is released from its arrested position, means pivotally carried by said cash drawer and spring-positioned to block and prevent said latching element from causing said cash drawer to become so arrested within the cash register and to prevent initiation of the machine operation when said money-tray insert is not in place, said means being provided with a portion abutting the money-tray insert when the latter is in position in said cash drawer, whereby upon movement of said drawer to said closed position when said money-tray insert is removed from said drawer, said means will be moved out of the blocking position to permit said latching element to pivot into cash drawer-arresting position.

10. The combination according to claim 9, further defined in that said devices comprise a rocker arm eccentrically oscillated about a pivot by a rotary motor-driven shaft of the machine, a pawl lever pivoted upon said rocker arm, means adjustable into and out of operative position to abut and turn said pawl lever when the rocker arm is pivoted, a second arm operatively connected to said operation-initiating member, said pawl lever rendering said second arm inoperative when pivoted in one direction, and means operatively connected to said latching element for limiting pivoting movement of said pawl lever in the opposite direction.

11. The combination according to claim 10, said means operatively connected to said latching element including a pin carried by the register between said pawl lever and said latching element, said latching element being pivotally mounted on said register, said pin being depressable by the pawl lever to pivot the latching element into non-latching position, spring means for retracting said pin when said drawer is pushed open, the pin thereupon forcing the pawl lever to turn in said one direction to render said record arm inoperative.

References Cited in the file of this patent

UNITED STATES PATENTS

| | | |
|---|---|---|
| 2,607,526 | Boyden et al. | Aug. 19, 1952 |
| 2,726,113 | Pisani | Dec. 6, 1955 |
| 2,818,825 | Marek | Jan. 7, 1958 |
| 2,859,715 | Courson | Nov. 11, 1958 |